United States Patent [19]
Watada et al.

[11] Patent Number: 5,487,046
[45] Date of Patent: Jan. 23, 1996

[54] MAGNETO-OPTICAL RECORDING MEDIUM HAVING TWO MAGNETIC LAYERS WITH THE SAME CURIE TEMPERATURE

[75] Inventors: Atsuyuki Watada, Kawasaki; Toshiaki Tokita, Zama; Motoharu Tanaka, Mishima, all of Japan

[73] Assignee: Ricoh Company, Ltd., Tokyo, Japan

[21] Appl. No.: 282,212

[22] Filed: Jul. 28, 1994

Related U.S. Application Data

[62] Division of Ser. No. 890,631, May 28, 1992, Pat. No. 5,369,629.

[30] Foreign Application Priority Data

May 31, 1991 [JP] Japan ................................. 3-155434

[51] Int. Cl.$^6$ ............................................. G11B 13/04
[52] U.S. Cl. ........................ 369/13; 428/694 ML; 365/122
[58] Field of Search ............. 369/13, 14, 275.2, 369/273; 360/114, 59; 365/122; 428/694 ML, 694 R, 694 MT, 694 RE, 694 MM, 694 EC

[56] References Cited

U.S. PATENT DOCUMENTS 4,926,402  5/1990  Masakawa ................... 369/13
5,224,080  6/1993  Ohtsuki ..................... 369/13

Primary Examiner—Georgia Y. Epps
Assistant Examiner—Tan Dinh
Attorney, Agent, or Firm—Cooper & Dunham

[57] ABSTRACT

A magneto-optical recording method for recording information in an overwrite mode in a magneto-optical recording medium by the application of a laser beam is disclosed. The magneto-optical recording medium includes a substrate, and at least two magnetic recording layers overlaid thereon, with an exchange force working at least between the two magnetic recording layers, and the Curie temperature of each of the two magnetic recording layers being substantially the same. The magneto-optical recording method includes the step of conducting overwriting information by changing the power of the laser beam to be applied to at least two different levels, one at which the magnetic recording layers are heated to a temperature near or higher than the Curie temperature, and the other at which the magnetic recording layers are heated to a temperature lower than the Curie temperature, while a magnetic field is applied to the magneto-optical recording medium in one direction, in accordance with signals to be recorded in the magneto-optical recording medium, and this recording method requires only one initialization by the application of the magnetic field, but does not require any further initialization thereafter.

1 Claim, 3 Drawing Sheets

L PROCESS

H PROCESS

MAGNETO-OPTICAL RECORDING MEDIUM HAVING TWO MAGNETIC LAYERS WITH THE SAME CURIE TEMPERATURE

This is a division of application Ser. No. 890,631, filed May 28, 1992, and now is U.S. Pat. No. 5,369,629.

BACKGROUND OF THE INVENTION

1. Field of the Invention

The present invention relates to a magneto-optical recording method and a magneto-optical recording medium for use in the magneto-optical recording method. More particularly, this invention relates to a magneto-optical recording method for recording optical information in an overwrite mode in an magneto-optical recording medium, reproducing recorded information and erasing the same with application of a laser beam thereto.

2. Discussion of Background

Conventional magneto-optical recording methods have a problem in that speedy information recording cannot be carried out because of the necessity for three steps of erasing, recording, and checking when information is recorded. The following overwrite systems have been proposed in order to solve this problem:

(i) Magnetic-Field Modulation System

In this system, recording is performed by reversing the polarity of a magnetic field applied at high speed, while the intensity of a laser beam applied is maintained constant, in accordance with the information to be recorded, as disclosed in Japanese Laid-Open Patent Applications 63-204532 and 63-76135. As mentioned above, in this system, the polarity of the magnetic field has to be reversed at high speed, so that the magnetic field for recording information has to be generated at a position away from the surface of a recording medium. For the generation of such a magnetic field, a large power is necessary. As a result, it is difficult to record the information at high frequency. A method of setting a magnetic head in close proximity to the surface of the medium has also been proposed. However, this method negates the inherent merit of the optical disc, that is, non-contact information recording.

(ii) Exchange Bonding Two-Layer Films System

This system is directed to the accomplishment of overwriting by use of exchange bonding between two recording layers which consist of an amorphous alloy of a rare earth metal and a transition metal, as disclosed, for instance, in Japanese Laid-Open Patent Application 62-175948. More specifically, a magneto-optical recording medium comprising a recording layer consisting of TbFe and an auxiliary layer consisting of TbFeCo is employed. Overwriting is accomplished by initializing the recording medium and then applying thereto an external magnetic field and laser beams with different powers. This system, however, has a problem in that a large magnetic field is necessary for the initialization of the recording medium.

SUMMARY OF THE INVENTION

It is therefore a first object of the present invention to provide a magneto-optical recording method, by which the merit of optical discs with regard to non-contact information recording is maintained, a process for initializing the recording medium by use of the magnetic field is made unnecessary, the size of an apparatus for recording information and reproducing the recorded information can be made small, and the costs for fabricating the optical discs are reduced.

A second object of the present invention is to provide a magneto-optical recording medium which is employed in the above magneto-optical recording method.

The first object of the present invention can be achieved by a magneto-optical recording method for recording information in an overwrite mode in a magneto-optical recording medium by the application of a laser beam, the magneto-optical recording medium comprising a substrate, and at least two magnetic recording layers overlaid thereon, with an exchange force working at least between the two magnetic recording layers, and the Curie temperature of each of the two magnetic recording layers being substantially the same, comprising the step of conducting overwriting information by changing the power of the laser beam to be applied to at least two different levels, one at which the magnetic recording layers are heated to a temperature near or higher than the Curie temperature, and the other at which the magnetic recording layers are heated to a temperature lower than the Curie temperature, while a magnetic field is applied to the magneto-optical recording medium in one direction, in accordance with signals to be recorded in the magneto-optical recording medium.

The second object of the present invention can be achieved by a magneto-optical recording medium comprising a substrate and at least two magnetic recording layers overlaid thereon, including a first magnetic recording layer and a second magnetic recording layer in view of the incident direction of a laser beam to be applied thereto for recording information and/or reproducing recorded information, each of the first and second magnetic recording layers comprising as the main component an amorphous alloy of a rare earth metal and an iron-family transition metal, and constituting a perpendicular magnetic layer, the Curie temperatures of the first magnetic recording layer and the second magnetic recording layer being substantially the same, the first magnetic recording layer being bonded to the second magnetic recording layer through the exchange force, the compensation point of the first magnetic recording layer being near room temperature, the magnetic moment of the rare earth metal of the alloy in the second magnetic recording layer exceeding the magnetic moment of the iron-family transition metal of the alloy in the second magnetic recording layer, and the compensation point of the second magnetic recording layer being not present in the range between room temperature and the Curie temperature of the second magnetic recording layer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A magneto-optical recording medium of the present invention will now be explained making reference to FIGS. 1, 2 and 3(a) to 3(e).

Figure 1:
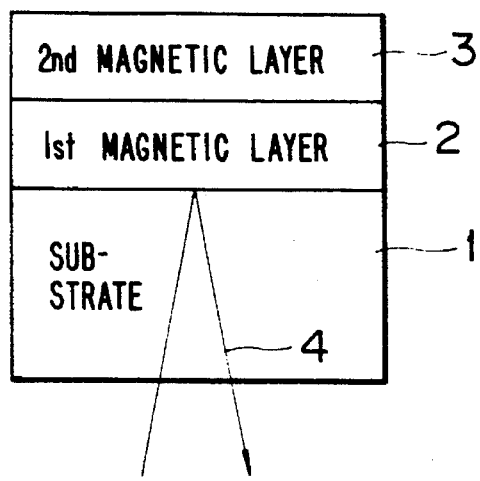
FIG. 1 is a schematic cross-sectional view of the most basic layer structure of a magneto-optical recording medium according to the present invention.

FIG. 1 shows a schematic cross-sectional view of the most basic layer structure of the magneto-optical recording medium of the present invention. The magneto-optical recording medium comprises a substrate 1, and a first magnetic recording layer 2 and a second magnetic recording layer 3 successively overlaid on the substrate 1. A laser beam 4 for recording information and reproducing the recorded information is applied to the recording medium from the side of the substrate 1.

Each of the first magnetic recording layer 2 and the second magnetic recording layer 3 constitutes a perpendicular magnetic recording layer comprising as the main component an amorphous alloy of a rare earth metal such as Dy, Tb, Gd, or Nd, and an iron-family transition metal such as Fe, Co, or Ni. An exchange force works between these two magnetic recording layers.

Figure 2:
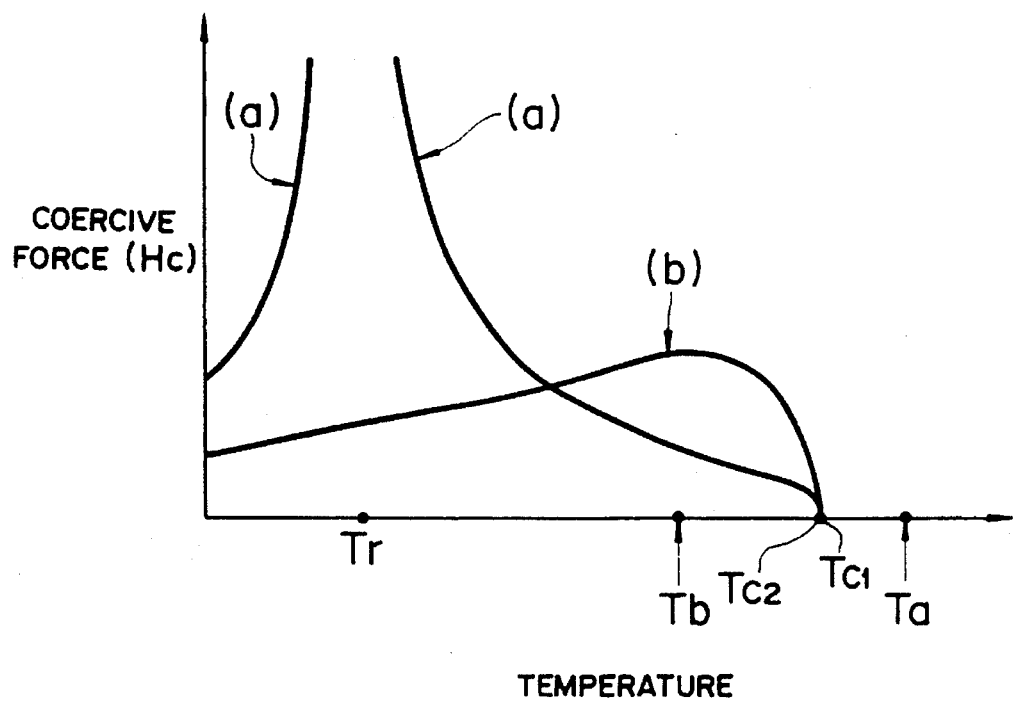
FIG. 2 is a graph showing magneto-optical properties of a magneto-optical recording medium according to the present invention having the layer structure shown in FIG. 1.

FIG. 2 shows the magneto-optical properties of the magneto-optical recording medium having the layer structure shown in FIG. 1. A curve (a) in FIG. 2 indicates the coercive force (Hc) of the first magnetic recording layer 2, and a curve (b) indicates the coercive force (Hc) of the second magnetic recording layer 3. $Tc_1$ and $Tc_2$ are respectively the Curie temperature of the first magnetic recording layer 2 and that of the second magnetic recording layer 3. $Tc_1$ and $Tc_2$ are substantially the same ($Tc_1 \approx Tc_2$).

In the present invention, the range in which $Tc_1$ and $Tc_2$ are substantially the same is regarded as follows under the conditions that $Tc_1$ is not higher than $Tc_2$: (a) the difference between $Tc_1$ and $Tc_2$ is within the range of the difference between the temperature of the first magnetic recording layer 2 and that of the second magnetic recording layer 3 during the recording process, and (b) even when $Tc_2$ is slightly higher than $Tc_1$, if the difference between them is such that the magnetization of the first magnetic recording layer 2 which is directed in the same direction as that of an applied bias magnetic field is not reversed by the exchange force from the second magnetic recording layer 3 even when the recording material is placed in a bias magnetic field in which L Process (which will be described later) can be carried out, and a laser beam is applied to carry out H Process (which will be also described later) to raise the temperatures of the recording layers 2 and 3 to a temperature close to $Tc_1$.

Tr is room temperature. The compensation point ($Tcomp_1$) of the first magnetic recording layer 2 is substantially the same as Tr ($Tcomp_1 \approx Tr$).

The magnetic moment of the rare earth metal of the alloy in the second magnetic recording layer 3 exceeds the magnetic moment of the iron-family transition metal of the alloy in the same. Moreover, the compensation point ($Tcomp_2$) of the second magnetic recording layer 3 is not present in the range between Tr and $Tc_2$.

It is preferable that the difference between $Tc_1$ and $Tc_2$ be within 20° C. at most, and the difference between $Tcomp_1$ and Tr be within 50° C. at most.

In the case where the concentration of the rare earth metal of the alloy in the second magnetic recording layer 3 is $X_0$, at which $Tcomp_2$ and $Tc_2$ are the same, it is preferable that the concentration (X) of the rare earth metal of the alloy in the second magnetic recording layer 3 satisfy the following condition:

$X_0 \leq X \leq X_0+10$ (atom %).

As the materials for use in the first magnetic recording layer 2 and the second magnetic recording layer 3 which satisfy the above-mentioned conditions, for instance, the combinations of TbFeCo and TbFeCo, TbFeCo and DyFeCo, and TbDyFeCo and TbDyFeCo can be provided.

Glass, glass on which guide tracks of ultraviolet curing resin are provided, polycarbonate, polymethyl methacrylate and an epoxy resin can be used as the material for the substrate 1.

Furthermore, as shown in FIGS. 3(a) to 3(e), other layers can be included in the magneto-optical recording medium having the layer structure shown in FIG. 1.

Figure 3A:
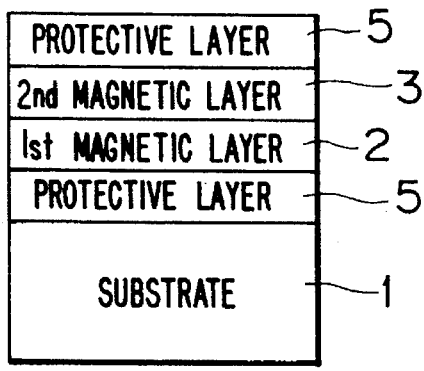
FIGS. 3(a) to 3(e) are schematic cross-sectional views of other examples of the layer structures of magneto-optical recording media according to the present invention.

FIG. 3(a) shows a magneto-optical recording medium in which protective layers 5 are provided between the substrate 1 and the first magnetic recording layer 2, and on the second magnetic recording layer 3.

Figure 3B:
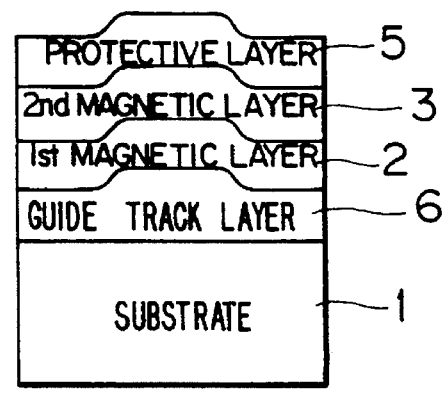

FIG. 3(b) shows a magneto-optical recording medium in which the protective layer 5 is provided on the second magnetic recording layer 3, and a guide track layer 6 is also provided between the substrate 1 and the first magnetic recording layer 2.

Figure 3C:
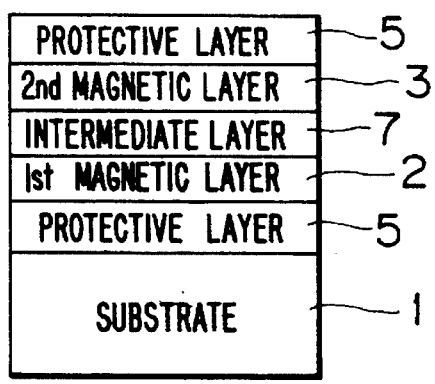

In FIG. 3(c), an intermediate layer 7 is interposed between the first magnetic recording layer 2 and the second magnetic recording layer 3 of the magneto-optical recording medium having the layer structure shown in FIG. 3(a).

Figure 3D:
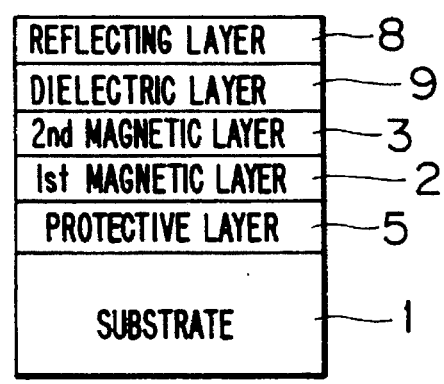

In FIG. 3(d), the protective layer 5 overlaid on the second magnetic recording layer 3 of the magneto-optical recording medium having the layer structure shown in FIG. 3(a) is replaced by a dielectric layer 9 and a reflecting layer 8 which are successively overlaid on the second magnetic recording layer 3.

Figure 3E:
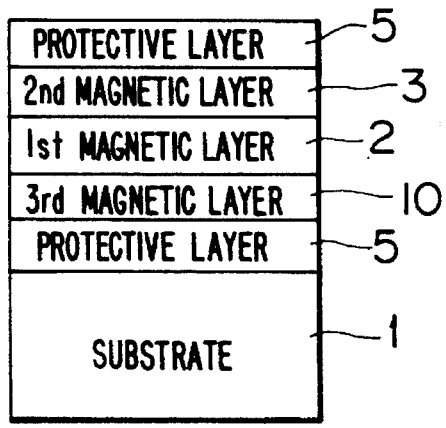

In FIG. 3(e), a third magnetic recording layer 10 is interposed between the protective layer 5 and the first magnetic recording layer 2 of the magneto-optical recording medium having the layer structure shown in FIG. 3(a).

In addition to the third magnetic recording layer 10 shown in FIG. 3(e), a plurality of magnetic recording layers can be employed in the magneto-optical recording medium of the present invention.

It is also possible to fabricate a duplex-side recordable magneto-optical recording medium by laminating two of the above-mentioned magnetic recording medium in such a fashion that the magnetic recording layers of each recording medium are directed to the inside of the duplex-side recordable magneto-optical recording medium.

A magneto-optical recording method of the present invention using the above-mentioned magneto-optical recording medium will now be explained making reference to FIGS. 4 and 5.

Figure 4:
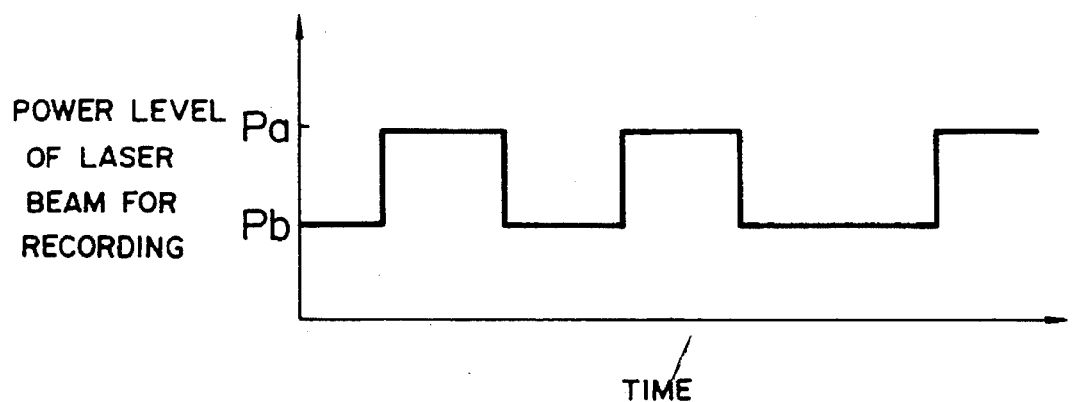
FIG. 4 is a diagram showing a power level of the laser beam for recording employed in the magneto-optical recording method according to the present invention.

In the present invention, as shown in FIG. 4, the power of the laser beam is changed to at least two different levels, in accordance with signals to be recorded in the magneto-optical recording medium.

When the power of the laser beam is changed to two different levels, it is preferable that the laser beam with a high level (Pa) shown in FIG. 4 raise the temperatures of the two magnetic recording layers of the magneto-optical recording medium to Ta, which is higher than $Tc_1$ and $Tc_2$, as shown in FIG. 2. However, a small amount of differences in the temperature can be allowed. Therefore, the temperatures of the first and second magnetic recording layers of the magneto-optical recording medium may respectively be lower than $Tc_1$ and $Tc_2$ by about 10° C.

It is preferable that the laser beam with a low level (Pb) shown in FIG. 4 raise the temperatures of the two magnetic recording layers of the magneto-optical recording medium to Tb, which is lower than $Tc_1$ and $Tc_2$, and higher than Tr by about 50° C. to 150° C., as shown in FIG. 2. As described above, a small amount of differences in the temperature can be allowed. The temperatures of the first and second magnetic recording layers of the magneto-optical recording medium may respectively be higher than $Tc_1$ and $Tc_2$ by about 10° C.

When the information is recorded, the magnetic field with an intensity of about 10 Oe to 200 Oe is applied in one direction to the magneto-optical recording medium.

Figure 5A:
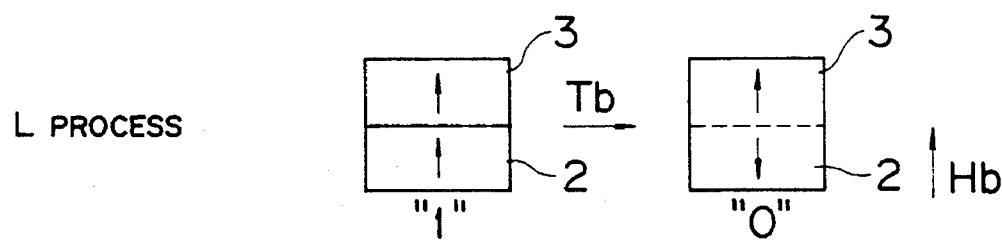
FIGS. 5(a) and 5(b) are diagrams showing an overwrite process in the magneto-optical recording method according to the present invention.
Figure 5B:
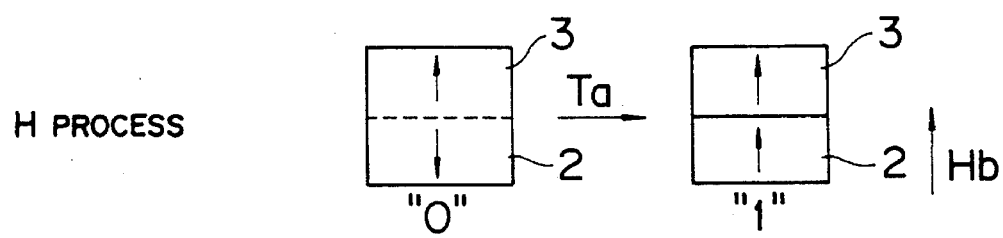

As shown in FIGS. 5(a) and 5(b), in the initialized condition of the magneto-optical recording medium, the direction of the magnetic moment in the second magnetic recording layer 3 is the same as that of the magnetic field for recording (Hb). The magneto-optical recording medium can be initialized by applying the magnetic field to the entirety of the medium, or by applying the magnetic field and the laser beam only to the recording track portions of the recording medium. In the present invention, once initialization is carried out, it is not necessary to initialize the recording medium whenever information recording is performed thereafter.

An overwrite process will now be explained. FIG. 5(a) shows the recording process when the laser beam with a low power is applied to the recording medium. Therefore, this process is referred to as L Process. When the direction of the magnetic moment of the iron-family transition metal in the first magnetic recording layer 2 is the same as that of the magnetic field Hb, it is supposed that a bit is "1", and when the direction of the magnetic moment of the iron-family transition metal is reversed, it is supposed that the bit is turned to "0".

When the laser beam with the low power level Pb is applied to the bit "1" of the magnetic recording layers, the bit "1", the temperatures of the magnetic recording layers are raised to Tb. As shown in FIG. 5(a), the magnetic field in the first magnetic recording layer 2 is reversed by the exchange force between the first magnetic recording layer 2 and the second magnetic recording layer 3. As a result, the bit is changed from "1" to "0".

FIG. 5(b) shows the recording process when the laser beam with a high power is applied to the recording medium. This process is referred to as H Process. When the laser beam with the high power level Pa is applied to the bit "0" of the magnetic recording layers, the temperatures of the magnetic recording layers are raised to Ta. As a result, the magnetic moments in the two magnetic recording layers are totally or almost completely eliminated. In the course of the temperature decrease, the exchange force between the first magnetic recording layer 2 and the second magnetic recording layer 3 becomes weaker than that in the L process as shown in FIG. 5(a). The magnetic moment in the first magnetic recording layer 2 is directed to the same direction as Hb. Therefore, the bit is changed from "0" to "1".

The overwrite is performed as described above. During the temperature decrease in the H process, the direction of the magnetic moment in the second magnetic recording layer 3 cannot be reversed and is the same as that of Hb.

Reproduction of the recorded information is performed by applying the magnetic field in the same direction as that of the magnetic field Hb, and applying the laser beam for reproduction. It is preferable that the intensity of the magnetic field for reproduction (Hr) be in the range of about 10 Oe to 1 kOe.

Excellent results can be obtained when Hr is larger than Hb. When Hr satisfies the above-mentioned conditions, even though the temperature of the recording medium is increased during the reproduction process, the direction of the first magnetic recording layer 2 is seldom reversed by the exchange force between the first magnetic recording layer 2 and the second magnetic recording layer 3, and the recorded information is not destroyed. Therefore, it is possible to apply the laser beam with a relatively high power level, and the C/N ratio of the recording medium can be improved.

The following effects can be obtained by the magneto-optical recording method and the magneto-optical recording medium of the present invention.

(1) Direct overwrite is possible.

(2) Non-contact information recording can be achieved because the magneto-optical recording method of the present invention is of a light-modulation system type. Therefore, the magnetic recording layers of the magneto-optical recording medium can be satisfactorily protected, and the reliability of the information recording thereon is high.

(3) Because the process for initializing the recording medium by use of the magnetic field is not necessary every time the information recording is performed, an electro-magnet for the initialization is unnecessary. Therefore, the size of an apparatus for recording information and reproducing the recorded information can be made small, and costs for fabricating the optical discs are low.

(4) Even through the laser beam with a high power level is applied to the recording medium when the recorded information is reproduced, the recorded information is not eliminated. Therefore, the reproduction C/N ratio can be improved.

What is claimed is:

1. A magneto-optical recording medium comprising a substrate and at least two magnetic recording layers overlaid thereon, including a first magnetic recording layer and a second magnetic recording layer in view of the incident direction of a laser beam to be applied thereto for recording information and/or reproducing recorded information, each of said first and second magnetic recording layers comprising as the main component an amorphous alloy of a rare earth metal and an iron-family transition metal, and constituting a perpendicular magnetic layer, the Curie temperatures of said first magnetic recording layer and said second magnetic recording layer being substantially the same, said first magnetic recording layer being bonded to said second magnetic recording layer through exchange force, the compensation point of said first magnetic recording layer being near room temperature, the magnetic moment of said rare earth metal of said alloy in said second magnetic recording layer exceeding the magnetic moment of said iron-family transition metal of said alloy in said second magnetic recording layer, and the compensation point of said second magnetic recording layer being not present in the range between room temperature and the Curie temperature of said second magnetic recording layer.

\* \* \* \* \*